REPETITIVE SCANNING OF A RECORD TRACK ON A FRAGMENT OF A RECORD

Filed Sept. 10, 1958 5 Sheets-Sheet 1

INVENTORS
WILLIAM F. SAARS
SUMNER GORDON
BY
Lee I Huntzberger
ATTORNEYS.

INVENTORS:
WILLIAM F. SAARS
SUMNER GORDON
BY
Lee I. Huntzberger
ATTORNEYS:

INVENTORS:
WILLIAM F. SAARS
SUMNER GORDON
BY
Lee I Huntzberger
ATTORNEYS

INVENTORS
WILLIAM F. SAARS
SUMNER GORDON
BY
Leel Huntzberger
ATTORNEYS

Jan. 22, 1963 S. GORDON ETAL 3,075,049

REPETITIVE SCANNING OF A RECORD TRACK ON A FRAGMENT OF A RECORD

Filed Sept. 10, 1958 5 Sheets-Sheet 5

INVENTORS
WILLIAM F. SAARS
SUMNER GORDON
BY
Lee I. Huntzberger
ATTORNEYS

United States Patent Office 3,075,049

Patented Jan. 22, 1963

3,075,049

REPETITIVE SCANNING OF A RECORD TRACK ON A FRAGMENT OF A RECORD

Sumner Gordon, New London, and William F. Saars, Niantic, Conn., assignors to The United States of America as represented by the Secretary of the Navy Filed Sept. 10, 1958, Ser. No. 760,274
4 Claims. (Cl. 179—100.2)
(Granted under Title 35, U.S. Code (1952), sec. 266)

Figure 1:
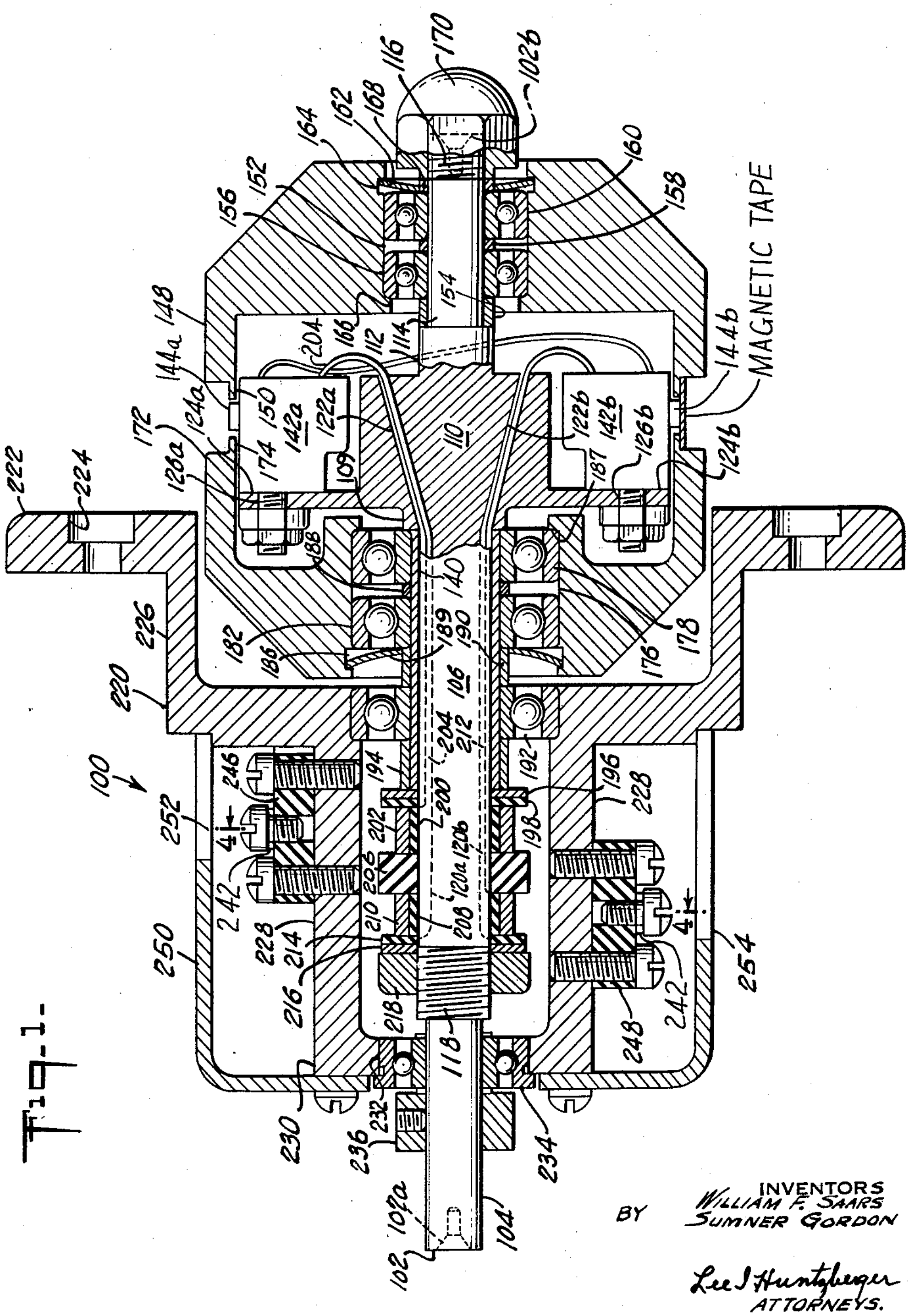

The invention described herein may be manufactured and used by or for the Government of the United States of America for governmental purposes without the payment of any royalties thereon or therefor.

This invention relates to repetitive scanning of a selected record track along a fragment of a record medium where the selected record track does not close on itself, and where the fragment having the selected record track is not physically dissociated from the remainder of the record medium. More particularly, this invention relates to examination in detail of signal data recorded on sections of an elongate record medium such as magnetic tape without cutting the tape to isolate the tape sections of interest.

It is common practice at the present time to record signals emanating from various sources to enable scrutiny and detailed examination of the signals at a conveniently selected time and under selected conditions. Heart sounds, radar and sonar echoes, oil exploration echoes, radio signals from space, geophysical mapping pulse echoes, fish and bat signals are examples of the variety of signals that are recorded for detailed study. Magnetic tape and wire recorders are commonly used for recording such signals but there are other types of recorders current available and which can record such signals; they record on disks, drums or belts and operate on magnetic, electrostatic, or modulated groove principles. Regardless of the type of recorder used, the signal is recorded along a continuous record track on the record medium. Recorded signals are reproduced from the record with the aid of suitable playback equipment by placing the sensing head of the playback equipment in sensing relation with the record track and moving the record and the sensing head relative to each other so that the sensing head traverses the record path. The sensing head generally can be brought into engagement with the record manually at any point along the record track and can be disengaged from the record track further along whereby it is a simple matter to play back a desired fragment of the record only. By marking points along the record track corresponding to the ends of the selected fragment, that fragment can be played back repeatedly by repeating the engaging and disengaging steps. By this method, a particular signal recorded on a fragment of a record can be observed over and over again at intervals with the aid of an oscilloscope or listened to over and over again with the aid of audio equipment.

Where the signal of interest has an irregular or complex waveform, it is not usually possible to analyze the signal if it is observed only transitorily at spaced intervals of time, as above, regardless of the number of times it is observed. It is necessary to present the signal waveform so that is is stationary on an oscilloscope screen, or properly continuous and of proper bandwidth for a waveform analyzer, and suitably multiplied, divided, spread, or compressed for other methods of signal analyses and study. This invention concerns a method and apparatus for accomplishing these functions.

An object of this invention is to repeatedly scan at a selected rate a record track on a selected fragment of a record continuously for a plurality of successive, end-to-end contiguous, non-overlapping scans without dissociating the fragment from the remainder of the record and which record track does not necessarily close upon itself for the purpose of enabling the signal recorded on said track to be examined and analyzed.

A further object is to provide an improved method and means of frequency multiplication, frequency division of a recorded signal, expansion or compression of a signal recorded on a record, examination and searching scrutiny of very short time intervals of an analogue signal, however complex, and examination of sinusoidal or continuously variable or complex or pulsed signals for subtle variations.

A further object is to provide an improved research tool for use in the study of magnetic recording tape and magnetic recording wire properties and magnetic head performance characteristics.

Figure 4:
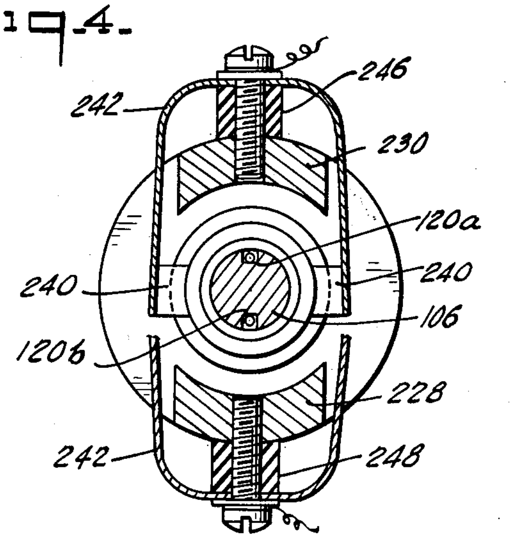
Figure 2:
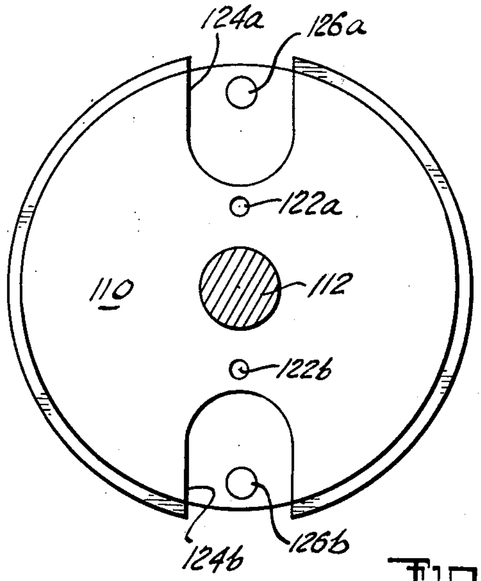
Figure 3:
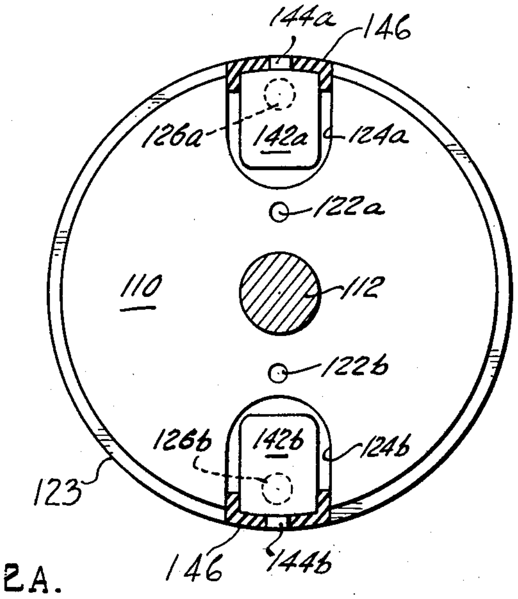
Figure 2A:
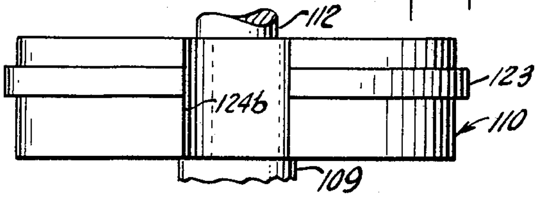
Figure 5:
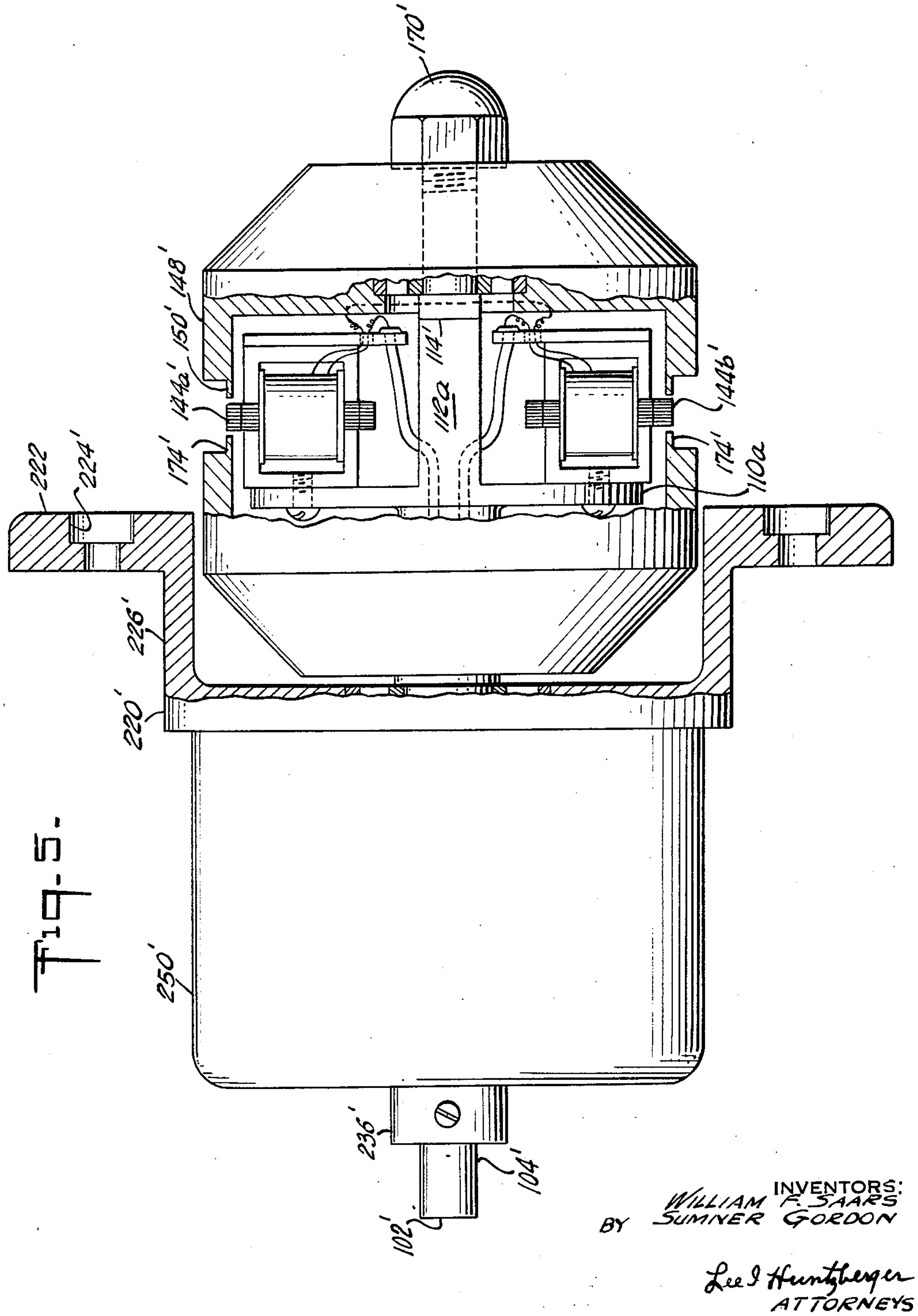
Figure 8:
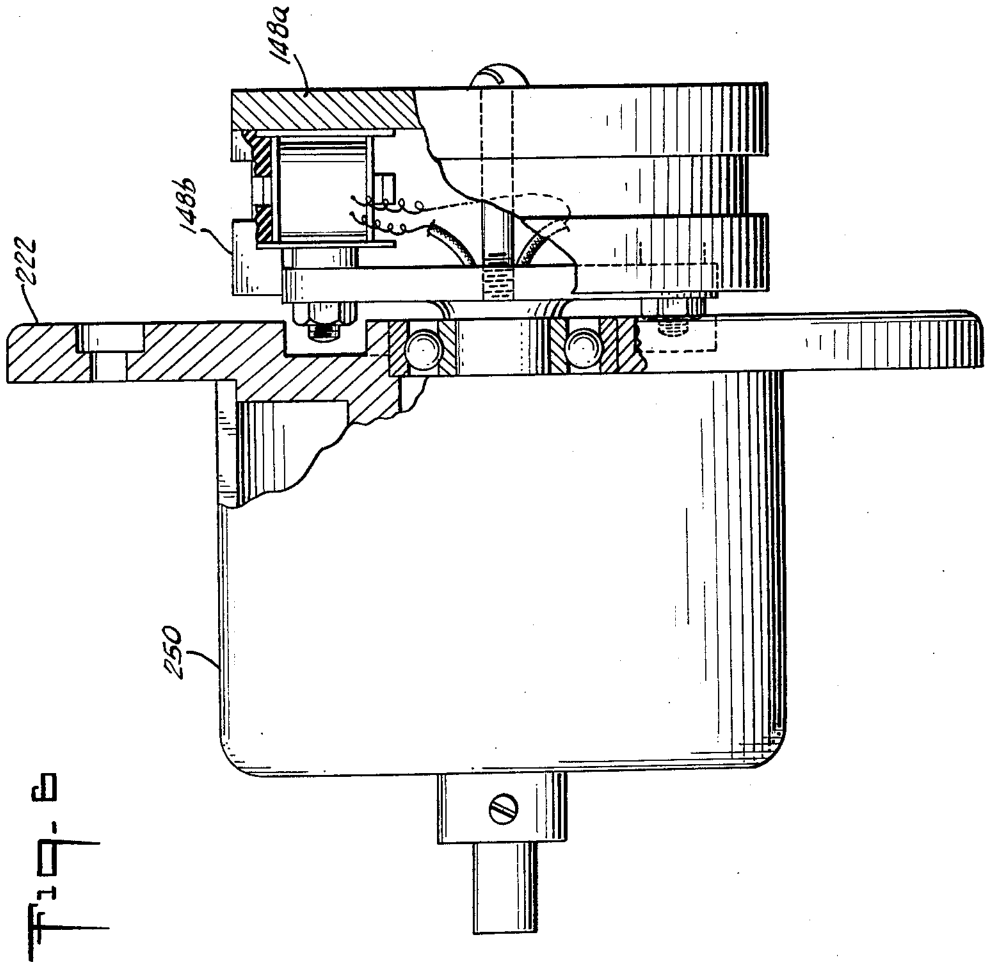
Figures 7, 8:
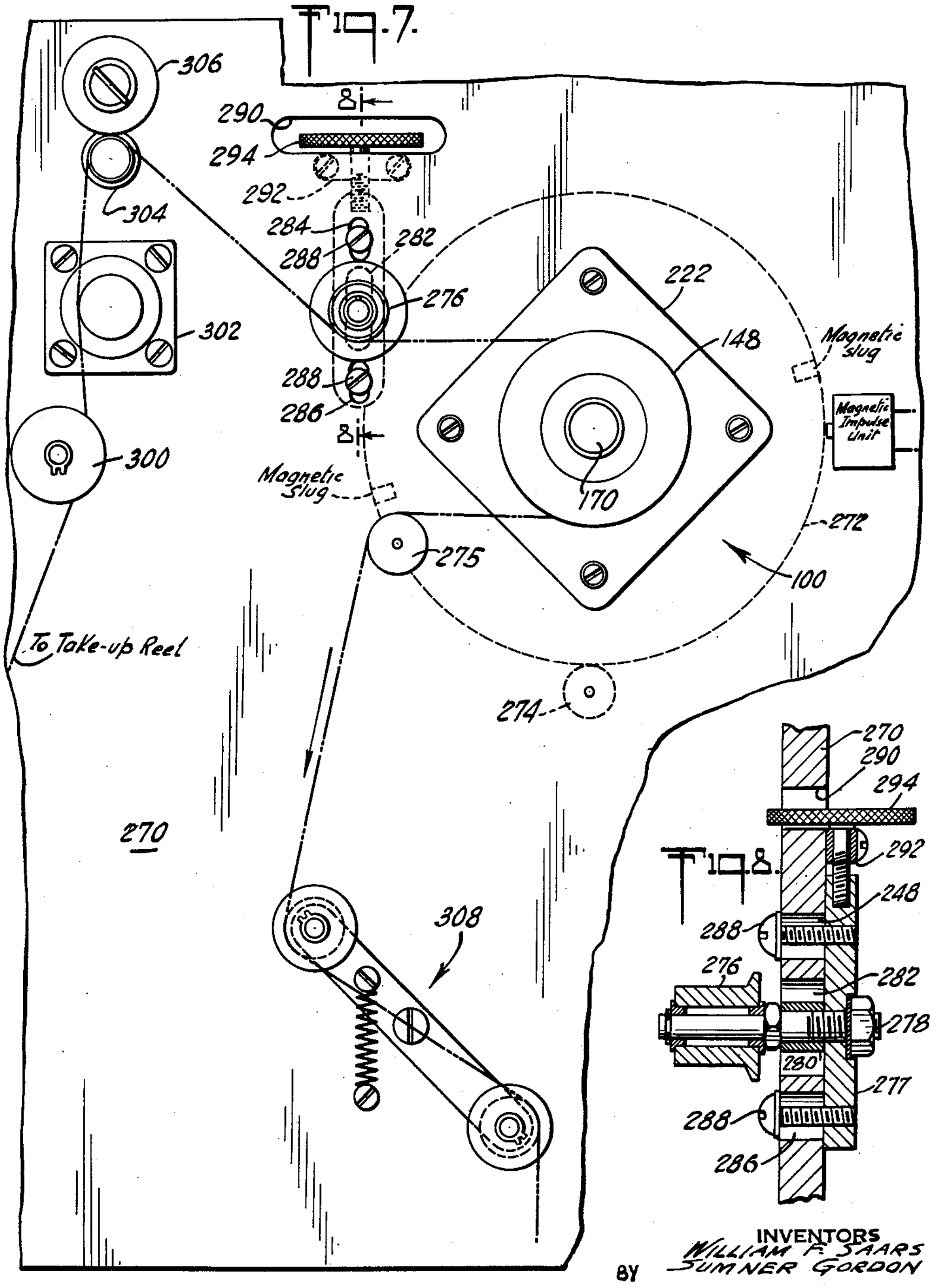

Other objects and many of the attendant advantages of this invention will be readily appreciated as the same becomes better understood by reference to the following detailed description when considered in connection with the accompanying drawings wherein:

FIG. 1 illustrates in cross-section an embodiment of a magnetic rotating head scan assembly in accordance with this invention, FIG. 2 is an end view of FIG. 1 taken from the right-hand end with the end cap removed and cutting across shaft section 112 and minus the magnetic heads, FIG. 2*a* is a side view of the structure in FIG. 2, FIG. 3 is a view like FIG. 2 but with the magnetic heads in place, FIG. 4 is a view taken along line 4—4 of FIG. 1, FIG. 5 shows another embodiment generally similar to that shown in FIG. 1 differing primarily in that in FIG. 1 the sensing tips of the magnetic heads terminate and form part of a continuous ring-like surface whereas in FIG. 5 the sensing tips of the magnetic heads are not part of a continuous ring-like surface, FIG. 6 shows another embodiment similar to that in FIGS. 1 and 5 except that in this embodiment all parts of the unit adjacent the magnetic heads are not movable relative to the magnetic heads, FIGS. 7 illustrates an assembly for utilizing the devices shown in FIGS. 1, 5, and 6, and FIG. 8 is a section taken along line 8—8 of FIG. 7.

The embodiments of the invention described herein are for magnetic tape records but this is not intended as limiting since the invention applies to the other conventional record types mentioned previously.

In its broader aspects, this invention concerns repetitively scanning the record track of any selected fraction or segment of a record medium with a suitable record sensing means by moving the record and the sensing means relative to one another so that the record track section of interest is sensed at every instant in one narrow local zone which moves from one end of the record track to the other end of the record track and coincidentally with the local zone leaving the record track at its other end, the local zone reappears at the one end of the track, the scanning action repeating for a plurality of successive scans enabling scrutiny, analysis and study of the waveform. The moving local zone is as narrow as possible, within practical limits, so that overlap of the played back ends of a record track is negligible. In the case of magnetic tape or magnetic wire, several inches of the record track can be readily played back for continuous display on an oscilloscope or for feeding the signal to a waveform analyzer. The length of track that can be continuously scanned in this manner is limited by practical considerations, such as the length of waveform that can be reasonably and clearly displayed on an oscilloscope, mechanical scanning speeds for properly transferring the signal to the oscilloscope or waveform analyzer, the minimum and maximum scan head size that can be readily fabricated and the drive means therefor. The sensing means must include at least two sensing tips. Only one sensing tip is in sensing engagement with the record track at any one time, as one sensing tip passes out of sensing engagement at one end of the record track a succeeding sensing tip passes into sensing engagement at the other end of the record track.

The rotating magnetic scan head 100 shown in FIGS. 1–4 includes a central integral rotary member 102 of nonmagnetic material such as nonmagnetic stainless steel, that is turned down with high accuracy from a piece of stock about an axis defined by centers **102*a* and 102*b*. Accuracy is important because eccentricity in the rotating scan head can distort a played back signal. Nonmagnetic material is important so as not to contribute to saturation of the magnetic heads carried thereon as described below. The rotary member 102 has an end section 104 of comparatively small diameter, a second section 106 of larger diameter adjacent thereto and about twice as long as section 102, a spacing shoulder 109 adjacent section 106, a fourth section 110 (FIG. 2) adjacent shoulder 109 and of considerably larger diameter, a short fifth section 112 adjacent to section 110, and a sixth section 114 that is of slightly smaller diameter than the adjacent fifth section 112. The section 114 of the rotary member is threaded at its free end 116 and one end 118 of the second section 106 is threaded. Two diametrically opposed slots 120*a* and 120*b* are milled longitudinally in the second section 106 and extend from the threaded portion 118 to spacing shoulder 109. Holes 122*a* and 122*b* are drilled through the section 110 to communicate with slots 120*a* and 120*b*, respectively. The dimensions of the slots 120 and holes 122 and the angle at which the holes 122 are drilled are not critical since they serve only as channels for insulated electric wires. The section 110 is formed with a peripheral integral ring 123** (FIGS. 2, 2*a*, and 3). Diametrically opposite portions of fourth section 110 are formed with recesses **124*a* and 124*b* (FIG. 2). Bolt holes 126*a* and 126*b* are drilled through the section 110** at the bottom of the recesses.

A sleeve 140 is secured on the section 106 in abutment with spacing shoulder 109. One method of securing the sleeve without introducing any unbalance in the rotary member 102 is fabricate the sleeve so that its inside diameter is the same as the outside diameter of section 106, freeze the rotary member 102 to cause it to contract and slip the sleeve over the section 106. When the rotary member 102 returns to room temperature it expands into secure engagement with the sleeve 140. With the sleeve 140 secured thereon, the rotary member 102 is carefully finished off so that sleeve 140, sections 104 and 114, and the peripheral ring portion 123 of section 110 are coaxial.

Magnetic record sensing heads **142*a* and 142*b* are mounted in the recesses 124*a* and 124*b* of the section 110. The magnetic heads are conventional, of high quality commerical variety, whose pole tips 144*a* and 144*b* are small in the sensing direction, and made arcuate with the same radius of curvature as ring 123. It is critical that the magnetic heads be substantially identical mechanically in terms of weight distribution so as not to render the rotary member 102 unbalanced and is as nearly identical electrically as is possible. A practical method of obtaining two magnetic heads with the necessary degree of identity is to obtain one or more dozen specimens of a selected high quality variety of magnetic head with small pole tips from a commercial supplier, ascertain the electrical characteristics of each by taking electrical measurements and then select the two magnetic heads whose electrical characteristics are most alike and which are alike mechanically insofar as is possible. The two selected heads are mounted in the recesses 124*a* and 124*b* of section 110 so that the pole tips are exactly in line with each other and with the axis of rotary member 102 and also so that the pole tips thereof terminate on the outer surface of the ring 123 of the section 110. This is readily accomplished with the aid of an optical comparator. The bolt holes 126*a* and 126*b* are sufficiently larger than the bolts to permit this adjustment. A filler material 146 (FIG. 3) such as thermosetting plastic fills the gap between the pole tips and ring 123 rendering the peripheral cylindrical surface of ring 123 continuous. This step may be carried out by wrapping tape around the ring 123 as a mold, then adding the filler material. After the tape is removed, the peripheral surface of the filler is polished so as to be smooth and continuous with ring 123** and the sensing tips of the magnetic heads. The two magnetic heads are connected in series.

Many commercial magnetic heads have opposed pole tips, e.g., the magnetic heads shown in FIGS. 5 and 6. However, it has been found that as a practical matter, one sensing head with two sensing tips cannot be used because the surfaces of the sensing tips are not as far from the center of the head as other portions of commercial sensing heads. If not for this limitation, one sensing head could be used.

A first tape edge guide 148 is mounted for free rotation on the section 114 of rotary member 102. Two dimensions of the tape edge guide 148 that must be very precise are the outside diameter of the lip 150 which must be equal to the outside diamter of ring 123, and the bore 152 which must seat bearings; the outside surface of the lip 150 and inside surface of the bore 152 must be coaxial with the axis of rotary member 102. The tape guide 148 must be nonmagnetic so that as the magnetic heads **142*a* and 142*b* move relative to the tape guide 148 there is no signal induced by the tape guide. Also, because the tape guide 148 is to be as free running as possible on the rotary member 102 so as to present minimum frictional impedance to magnetic tape that it guides, it is made of lightweight material such as aluminum and is recessed as much as possible. To assemble the tape guide 148 on the rotary member 102, first the guide 148 is positioned over the section 114. Then spacer sleeve 154, ball bearing 156, spacer 158, ballbearing 160 are slipped onto the section 114 in sequence. A dished retaining ring 162 is disposed in groove 164 of the tape guide 148 and under stress engages the ball bearing 160 so that the inside lip 166 of the tape guide 148 bears firmly against the outer race of ball bearing 156. A spacer 168 then is slipped onto section 114 under retaining ring 168, being small enough not to interfere therewith, and an acorn nut to provide a smooth free end to the rotary member engages threaded portion 116. The length of spacer 154 is such that lip 150 of the tape guide 148 is close to ring 123 of section 110**.

A second tape edge guide 172 similar in design and function to tape edge guide 148 and likewise non-magnetic is assembled on the sleeve 140 from the other end of rotary member 102 for free rotation thereon. The outside diameter of lip 174 must equal the outside diameter of ring 123; the bore 176 must register with the outer races of ball bearings. The outside surface of lip 174 and the inside surface of the bore 176 must be coaxial with the axis of rotary member 102. To assemble the tape guide 172 on the rotary member 102, first the guide 172 is positioned over the rotary member 102. Then bearing 178, spacer 188, and ball bearing 182 are slipped onto the sleeve 140 in sequence and within the confines of the tape edge guide 172. A dished retaining ring 189 is disposed in groove 186 of the tape guide and under stress engages the inner race of ball bearing 182 so that the outer race of ball bearing 178 bears against inside flange 187 of tape guide 172. The lip 174 terminates close to ring 123.

A spacer 190 is slipped onto sleeve 140 and under retaining ring 189 with clearance therebetween, followed in sequence by a ball bearing 192, spacer 194, metal washer 196, and an insulating washer 198. An insulating sleeve 200 and a slip ring 202 concentric therewith follow the washer 198; they are filed at one end to provide a radial notch, not shown for seating a conductor. A short length of fine insulated wire 204 is soldered at one end to the notched portion of slip ring 202 and nested in the notches of the slip ring 202 and the insulating sleeve 200, and then the insulating sleeve 200 and slip ring 202 are slipped onto rotary member 102 together and at the same time the insulated wire 204 is threaded through the slot 120*a* in section 106 and the hole 122*a* in section 110 the sleeve and slip ring abuts the insulating washer 198; the free end of wire 204 projects out of hole 122*a* and is electrically joined to the magnetic head 142*a*.

An insulating spacing collar 206 then is slipped onto rotary member 102. An insulating sleeve 208 and a slip ring 210 concentric therewith follow the collar 206; they are filed at one end to provide a radial notch not shown for seating a conductor. A short length of fine insulated wire 212 is soldered at one end to the notched portion of the slip ring 210 and is nested in the notches in both the slip ring 210 and the insulating ring 208 and then together are slipped onto the rotary member 102 as the wire 212 is threaded through the slot 120*b* in section 106 and the hole 122*b* in section 110 until the sleeve and slip ring abut the insulating collar 206; the free end of the wire 212 projects out of hole 122*b* and is electrically joined to magnetic head 142*b*. An insulating washer 214, a metal washer 216, and a jam nut 218 engaged with threaded portion 118 of section 106 secure the slip ring assembly on the rotary member 102. The wipers for the slip rings are supported on a mounting member 220 for the rotatable assembly.

The mounting member 220 is formed with a flange 222 having bolt holes 224, integral with a cup-like section 226 from which extends longitudinally a pair of parallel arms 228 terminating in an integral ring 230. The inside diameter 232 of the ring 230 and the inside diameter of the bore through the bottom of the cup-like section 226 must be coaxial. A ball bearing 234 is mounted in ring 230. Then the mounting means 220 and the rotatable assembly are assembled end wise. A collar and set screw 236 secures the mounting means 220 and the rotatable assembly together.

Paired wipers 240 (FIG. 4), secured to the ends of two U-shaped spring members 242, one for each slip ring are provided for engagement with the slip rings 202 and 210. The engaging surfaces of the wipers and slip rings must be smooth to minimize the noise level introduced into the signal by this assembly. The signal-to-noise ratio can be improved by incorporating a transistorized preamplifier in the scan head assembly to lessen the effect of noise introduced at the wiper contacts. Also, the wipers must be nonmagnetic, or as little as possible, so as not to induce pulses in the magnetic heads during each revolution of the rotatable assembly. An insulating support 246 for one of the U-shaped springs 242 is secured to one of the arms 228, and an insulating support 248 for the other of the U-shaped springs 242 is secured to the other arm 228. A cover 250 is secured to the ring 230. The metal cover 250 is slotted endwise at 252 and 254 to provide passageways for electrical connections (FIG. 4) to an oscilloscope, waveform analyzing equipment, or the like, not shown.

FIG. 7 illustrates a tape feed arrangement for the rotating head assembly described above. The unit 100 is mounted on a panel 270. A flywheel 272 is secured to the rotatable part of the assembly to minimize wow during scanning. A pair of magnetic slugs are secured to the flywheel in line with the sensing tips, not shown in FIG. 7, and a magnetic impulse unit is supported adjacent the periphery of the flywheel for generating a pulse for counting or for synchronizing the sweep on an oscilloscope. The flywheel is friction driven by a rubber wheel 274 on the shaft of a drive motor, not shown. An idler 275 is mounted on the panel 270 adjacent the unit 100. A second idler 276 is mounted adjacent the unit 100 and is adjustable so that record tape engaging the unit 100 and idlers 275 and 276 engages the unit 100 arcuately for precisely 180 degrees. The adjustable mounting for idler 276 includes an oblong flat member 277 to which is secured a stud 278 supporting a sleeve 280. The idler 276 is mounted for free rotation on the end of the stud 278 remote from member 276. The panel 270 is formed with an oblong hole 282 whose width is substantially the same as the outside diameter of sleeve 280 and the sleeve is disposed in registration with the hole 282. Beyond the ends of the oblong hole 282, the panel is formed with two more oblong holes 284, 286 through which pass screws 288 for adjustably securing the oblong member 277 to the panel 270. Beyond the hole 286, the panel is formed with another oblong hole 290 transverse to the others, and alongside the hole 290 is secured a bearing member 292 for a thumbscrew 294 whose head extends transversely through the hole 290 and whose other end is threadedly engaged with the member 277. A snap ring 296 retains the thumbscrew 294 in position in the bearing 292.

To adjust the idler 276, magnetic tape having a simple waveform signal recorded thereon is disposed in engagement with unit 100 and idlers 275 and 276, with the tape held stationary and under tension. The unit 100 is electrically connected to the vertical deflection means of an oscilloscope. The above-mentioned sine pulse generator is connected to the horizontal sweep circuit and then the rotatable member is driven at a constant speed. The horizontal sweep is adjusted so that there are two scans for every rotation of the member 102. With the screws 288 loosened, the thumbscrew is rotated to micrometrically adjust the wrap to 180 degrees. If the wrap is less than 180 degrees, a notch appears in the signal envelope at the scan rate. As the wrap is increased to more than 180 degrees, a peak is superposed on the signal envelope at intervals equal to the scan rate. This adjustment becomes critical at short wavelengths and phase distortion is introduced if each sensing tip does not engage the tape in identical phase relationship to any sine wave signal recorded on the tape. With random analog data, this is less important. If the arcuate engagement is less than 180 degrees, less than maximum utility is achieved. The screen persistence of the oscilloscope selected for this purpose must be proper for the order of the scanning speed of the rotating head assembly.

There is also secured on the panel 270, an idler 300, a conventional stationary magnetic head 302, tape drive capstan 304 and rubber idler 306 for insuring good frictional engagement between the tape and the capstan. The drive for the capstan must be controllably variable for a variety of speeds from zero upward. A spring-loaded tape compliance arm 308 is mounted on the panel beyond idler 272. An erase head is omitted for clarity. Additional tape stabilizing rollers and a flywheel load for at least one of the idlers can be added to further insure smooth and straight tape travel over the heads. To rapidly monitor a tape to check for anything of interest, the magnetic head 302 may be used to play back the recorded signal and the unit 100 may be bypassed by the tape. If there is anything of interest on the tape, the section or sections of interest of the tape are disposed in engagement with the unit 100 to enable detailed examination of the recorded signal.

The modification of the rotating scan head assembly shown in FIG. 5 differs from that shown in FIG. 1 primarily in that the magnetic head sensing tips of the assembly shown in FIG. 5 are not part of a ring such as 123 (FIGS. 2*a* and 3) and in the assembly shown in FIG. 1 whereby the tape is supported only along its edges. Though the magnetic sensing heads shown here are different from those shown in FIG. 1, there is no significance in the difference but is merely illustrative of variety available in the commercial market. Also because there is no ring 123, the magnetic sensing heads are supported by a circular flange instead of a recessed relatively massive section as section 110 in FIG. 1. In this assembly, the recorded surface of the tape is subjected to the wiping action of the sensing tips only rather than by a continuous ring as 123 in FIG. 1. This arrangement is advantageous as far as tape wear is concerned. Since each sensing tip should emphatically push against the surface of the tape as it engages and leaves the latter during rotation, the sensing tips should protrude radially beyond the tape support surface on the order of .005 inch. However, it was found that a pronounced transient and related harmonics are generated as a result of each sensing tip whipping the tape namely each 180 degrees revolution of the rotatable unit. In the embodiment shown in FIG. 1, there is some advantage in having the sensing tips protrude radially beyond the tape support surface up to about .0005 inch but the transient generated because of it is substantially negligible. The friction between tape and the rotatable unit in FIG. 1 is far greater than tape and the rotatable unit in FIG. 5. When it is necessary to scan continuously a selected fragment of tape at high speed for fifteen minutes or more, the oxide coating on some tapes becomes heated and deteriorates accompanied by reduction of signal. This loss is even more pronounced where the data on the tape is characterized by fine grain spectrum. In using the embodiment of FIG. 5 it was found that a tape fragment could be scanned for several hours with little reduction in signal leaving only a polished effect apparent on the oxide surface.

The modification shown in FIG. 6 differs from that shown in FIG. 1 in that it does not include freely rotatable endcaps 148 as in FIG. 1 for guiding the tape past the magnetic sensing heads but instead includes tape guide means that is immovable relative to the magnetic sensing heads and wherein the sensing tips form part of a continuous ring surface as in the embodiment of FIG. 1. The prime advantage of this structural arrangement over those in FIGS. 1 and 5 is that the tape guides, in not moving relative to the sensing heads, cannot possibly induce any signal in the sensing heads. However, this structure has the disadvantage causing wear at even a faster rate than the structure of FIG. 1.

The influence of minute random magnetic fields is considerable when the scanning heads are operated at high speed because even the slightest field can cause an appreciable magnetic pulse of amplitude sufficient to mask in part or even entirely the signal of interest. It is best to demagnetize all possibly susceptible material near the scan heads before high speed operation.

It was observed during use of the rotating scan heads that for any signal scanned, peak response is obtained when the ratio of scan speed to frequency observed by the scan head is identical to the ratio of tape velocity and frequency established when the signal was originally recorded.

The equipment described can receive tape directly from a recording head and while in motion, can scan the tape at various speeds. However, it has been found that greater utility is realized where the tape is advanced until a desirable section of recorded material is located and then the tape is stopped and the scan assembly operated. This permits examination of a single pulse by repeating it over and over at such a rate that a very narrow band spectrum analysis can be performed. Scan speed must not be increased beyond that velocity where wavelengths approach the gap size of the sensing tips, else discriminating factors are introduced. The equipment has been successfully utilized for signal frequency multiplication and division. First, by reproducing subsonic energy at velocities greater than the recording velocity the signal frequency range is multiplied to a bandwidth over which high speed analyzers may function, properly compensated for the related frequency multiplication. Second by reproducing supersonic energy at velocities lower than recording velocity the signal frequency range is divided down to a bandwidth convenient for study.

Obviously many modifications and variations of the present invention are possible in the light of the above teachings. It is therefore to be understood that within the scope of the appended claims the invention may be practiced otherwise than as specifically described.

We claim:

1. A rotatable magnetic scan head assembly for use in repetitively scanning a selected segment of an elongate flexible magnetic record medium comprising a plurality of magnetic pickup heads that have substantially identical electrical characteristics and that have record sensing pole tips whose face areas are substantially identical and are of minimal width in the scan direction, a member supported for rotation about an axis therethrough, said magnetic heads being secured on said rotatable member with said pole tips radial with respect to said axis and the centers of the faces of said pole tips being in a common plane normal to said axis and the centers of said pole tips of said magnetic heads being arcuately spaced apart about said axis by an angle equal to 360 degrees divided by the number of said magnetic heads and the faces of said pole tips being equidistant from said axis, means on said rotational member for supporting a segment of said magnetic medium in an arcuate configuration for an arcuate distance equal to 360 degrees divided by the number of magnetic heads contiguous with the circular path of the faces of said pole tips about said axis for magnetic scanning by said pole tips, said means on said rotational member for supporting a segment of magnetic medium in an arcuate configuration including a ring-like member on each side of the circular path of the pole tips, said ring-like members being supported concentric with said axis for rotation about said axis together with said rotational member whereby when said pole tips are driven in their circular path there is no spurious magnetic pickup from elements on said assembly immediately adjacent said magnetic heads because there is no relative movement between said magnetic heads and elements on said assembly immediately adjacent thereto, and electrical means on said rotational member for delivering electrical signals from said magnetic heads to utilization circuitry, whereby when a segment of an elongate magnetic record medium is supported in arcuate configuration contiguous with an arcuate portion of the circular path of said pole tips for an arcuate distance equal to 360 degrees divided by the number of magnetic heads, and said rotatable member is rotated, said pole tips scan the segment of the elongate magnetic record medium in succession with substantially no gap or overlap between successive scans by successive pickup heads and any signal on that segment is delivered by said electrical means at a repetition rate which is equal to the rotational rate of said member multiplied by the number of said magnetic heads whereby a signal recorded on that segment of the record medium may be reproduced for an interval long enough for detailed analysis.

2. A rotatable magnetic scan head assembly for use in repetitively scanning a selected segment of an elongate flexible magnetic record medium comprising a plurality of magnetic pickup heads that have substantially identical electrical characteristics and that have record sensing pole tips whose face areas are substantially identical and are of minimal width in the scan direction, a member supported for rotation about an axis therethrough, said magnetic heads being secured on said rotatable member with said pole tips radial with respect to said axis and the centers of the faces of said pole tips being in a common plane normal to said axis and the centers of said pole tips of said magnetic heads being arcuately spaced apart about said axis by an angle equal to 360 degrees divided by the number of said magnetic heads and the faces of said pole tips being equidistant from said axis, means for supporting a segment of said magnetic medium in an arcuate configuration for an arcuate distance equal to 360 degrees divided by the number of magnetic heads contiguous with the circular path of the faces of said pole tips about said axis for magnetic scanning by said pole tips, said means for supporting a segment of magnetic medium in an arcuate configuration including a ring-like member on each side of the circular path of the pole tips, said ring-like members being supported on said rotational member concentric with said axis for free rotation relative to said rotational member to minimize frictional wear of the magnetic medium during scanning thereof by said magnetic heads, and electrical means on said rotational member for delivering electrical signals from said magnetic heads to utilization circuitry, whereby when a segment of an elongate magnetic record medium is supported in arcuate configuration contiguous with an arcuate portion of the circular path of said pole tips for an arcuate distance equal to 360 degrees divided by the number of magnetic heads, and said rotatable member is rotated, said pole tips scan the segment of the elongate magnetic record medium in succession with substantially no gap or overlap between successive scans by successive pickup heads and any signal on that segment is delivered by said electrical means at a repetition rate which is equal to the rotational rate of said member multiplied by the number of said magnetic heads whereby a signal recorded on that segment of the record medium may be reproduced for an interval long enough for detailed analysis.

3. A magnetic scan head assembly for use in continuously repetitively scanning a selected record track segment that does not close upon itself and that is on a fraction of a magnetic record medium comprising: a plurality of magnetic pickup heads that have substantially identical electrical characteristics and that each have a pole tip with a record sensing scanning face, said scanning faces being substantially identical in minimal width in the scan direction, means for relatively moving said fraction and said heads in succession so that said scanning faces successively traverse said segment in sensing relation thereto with one of said scanning faces passing from sensing relation with respect to said segment at one end thereof as the successive scanning face passes into sensing relation to said segment at the other end thereof, means for adjusting the magnetic record medium relative to the pickup heads so that there is substantially no gap or overlap between successive scans by the pickup heads, and means for continuously delivering electrical signals developed in said heads.

4. A record pickup means for use in continuously repetitively scanning a fraction of a record medium along a record path thereof which does not close upon itself which comprises: sensing means including a plurality of record sensing tips whose scanning face areas are substantially identical in minimum width in the scan direction, means for moving said record sensing itps in succession along a selected path with one only of said tips along said selected path at every instant, such that when one of said tips is at one end of said path a successive one of said tips is at the other end of said path, means for supporting said fraction of said record medium contiguous with said path, means for adjusting the magnetic record medium relative to the pickup heads so that there is substantially no gap or overlap between successive scans by the pickup heads, and means for collecting any signal sensed by said tips for use in utilization circuitry, whereby when said fraction of said record medium is supported contiguous and coextensive with said path and said tips are moved successively along said path and relative to said fraction of said record medium, information recorded on said fraction of said record medium is sensed by said sensing means and is collected by said collecting means.

References Cited in the file of this patent

UNITED STATES PATENTS

| | | |
|---|---|---|
| 2,170,751 | Gabrilovitch | Aug. 22, 1939 |
| 2,352,023 | Schiller | June 20, 1944 |
| 2,528,699 | Masterson | Nov. 7, 1950 |
| 2,539,837 | Howell | June 30, 1951 |
| 2,611,828 | Gunby | Sept. 23, 1952 |
| 2,647,168 | Rivas | July 28, 1953 |
| 2,737,646 | Muffly | Mar. 6, 1956 |
| 2,773,120 | Masterson | Dec. 4, 1956 |
| 2,794,066 | Mullin | May 28, 1957 |
| 2,832,840 | Morin | Apr. 29, 1958 |
| 2,903,521 | Ellison | Sept. 8, 1959 |